E. F. GOUDARD.
COCK.
APPLICATION FILED JULY 27, 1914.

1,166,350.

Patented Dec. 28, 1915.
2 SHEETS—SHEET 1.

Witnesses
M. E. McDade
[signature]

Inventor
Edmond F. Goudard
by James L. Norris,
Attorney

UNITED STATES PATENT OFFICE.

EDMOND FÉLIX GOUDARD, OF NEUILLY-SUR-SEINE, FRANCE.

COCK.

1,166,350.

Specification of Letters Patent.   Patented Dec. 28, 1915.

Application filed July 27, 1914.   Serial No. 853,376.

*To all whom it may concern:*

Be it known that I, EDMOND FÉLIX GOUDARD, citizen of the Republic of France, residing at 190 Avenue de Neuilly, Neuilly-sur-Seine, Seine, France, have invented certain new and useful Improvements in Cocks, of which the following is a specification.

This invention relates to devices or more exactly to cocks for closing conduits, and it concerns more particularly the cocks used as throttle valves in carbureters for oil engines.

The invention has for its main object to avoid the noise produced, when such devices are nearly in their closed position, by the fluid passing through them.

The invention mainly consists in constructing the plug of the said devices in such a manner that the active part or parts of the said plug (if the said plug comprises more than one active part, i. e. an active part for each port in the shell of the said devices) have approximately the same shape as the corresponding ports of the containing shell of the plug.

The invention further consists in constructing in such a manner the plug of the said devices that its bearing parts be provided with an annular recess adapted to receive anti-frictional members and with a movable disk for retaining said members in position; and, in so forming either or all of said annular recesses that said anti-frictional members are maintained in the said recesses should the plug be taken away from its shell.

The invention further consists in other features of construction which will be hereinafter more clearly set forth and finally specified in the concluding claims.

For a clear understanding of the invention reference may be had to the accompanying drawings in connection with the following description.

Figure 1:
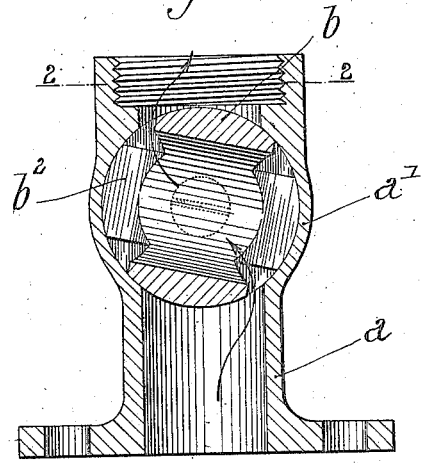
Figure 2:
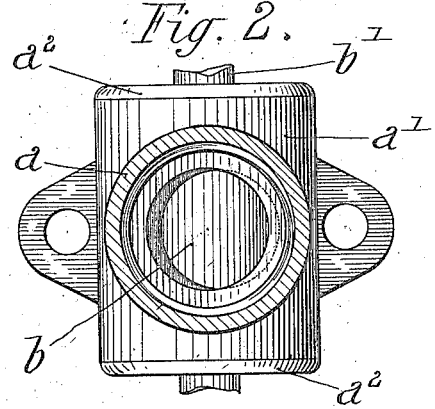
Figure 3:
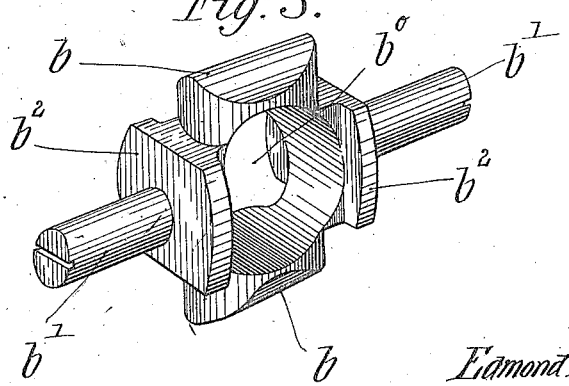
Figure 4:
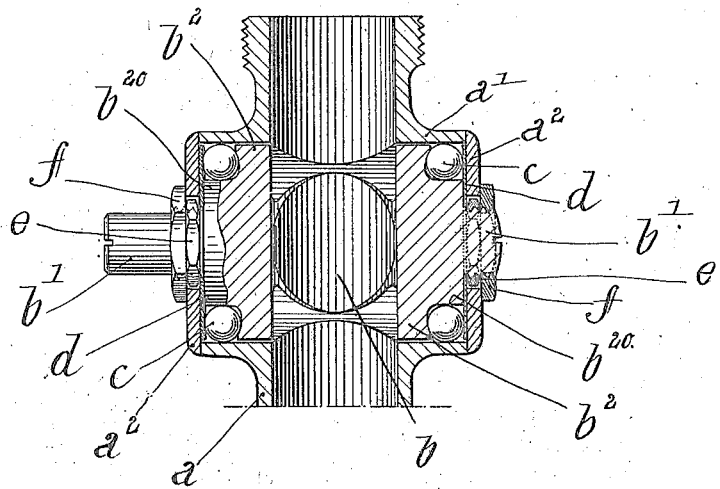
Figure 5:
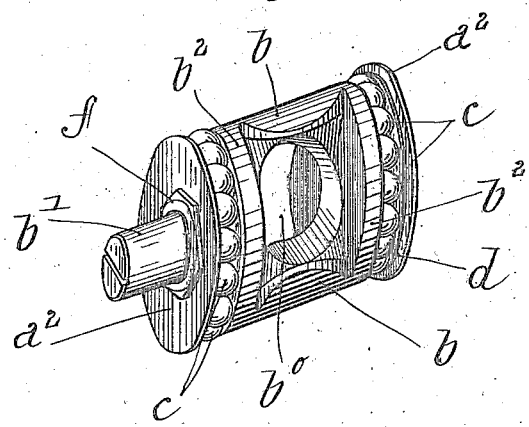

Figure 1 is a longitudinal sectional view of a conduit provided with a cock constructed according to a first method of carrying out the invention. Fig. 2 is a cross section taken on line 2—2 of Fig. 1. Fig. 3 shows a perspective view of the plug of the said cock removed from the conduit. Fig. 4 shows a longitudinal sectional view of a conduit, taken at right angles to Fig. 1, and illustrating a slightly modified construction of cock, in accordance with the invention. Fig. 5 shows a perspective view of the plug of the cock shown in Fig. 4 and removed from the conduit.

It may be for instance supposed that the conduit $a$ shown in the drawings is the suction pipe of a carbureter and that the throttle valve of the said carbureter is constituted by cock $b$. A part of the said conduit is so constructed as to form a shell $a'$ for the cock. The shell $a'$, in the preferred embodiment herein shown, is substantially cylindrical in cross-section and extends laterally or transversely of the conduit. The shell receives the cock $b$ and has its ends closed by the circular plates $a^2$.

The plug of the cock comprises a cylindrical part $b$, the cross-section of which has the same shape as the cross-section of the ports, which place into communication the shell $a'$ and the conduit $a$; the cross-section of the cylindrical part $b$ is equal, or preferably slightly greater, than the cross-section of the said ports; the said cylindrical part $b$ is further provided with a hole $b^o$, the axis of which is perpendicular to the axis of the said cylindrical part. The said hole, which has preferably the same cross-section as the said ports, constitutes the port of the plug. Finally the cylindrical part $b$ has its ends limited by a cylindrical surface the axis of which is perpendicular to the plane passing through the axis of the cylindrical part $b$ and through the axis of the hole $b^o$; the said cylindrical surface having the same diameter as the internal diameter of the shell. The plug $b$ is further provided with pins $b^1$, the axis of which coincides with the axis of the said cylindrical surface; the said pins pass through suitable holes provided in the plates $a^2$. The said pins $b^1$ are connected to the cylindrical part $b$ by means of a bearing part $b^2$, which may be either, as shown in Fig. 3, cut away in two opposite points, or better, as shown in Fig. 5, entirely circular.

When the plug $b$ is mounted in the shell $a'$ and is in its closed position, and the plug is moved from the said closed position in order to be brought in its opened position, the passages obtained at the beginning of such a movement, between the active parts $b$ of the plug and the edges of the ports of the shell, have the form of crescents as clearly shown in Fig. 2. The sections of the said passages have consequently the greatest perimeter which it is possible to obtain, and thus the noise produced by the fluid passing through the said passages is considerably reduced.

Advantageously, as shown in Figs. 4 and 5, the bearing parts $b^2$ of the plug are each formed in their ends with an annular recess for the reception of anti-frictional members $c$.

An annular disk $d$, having an external diameter the same diameter as the part $b^2$ and an internal diameter the same diameter as the pin $b^1$, is fixed in such a manner against each one of the said parts $b^2$ that it forms with the said recess a pocket groove $b^{20}$, said recesses being formed with their wall opposite said disks outwardly inclined from the bottom or lower wall of the recess so as to provide substantially an overlying peripheral flange in said recesses to prevent the escape of the ball bearings $c$ from the pocket groove $b^{20}$, and the plug is taken away from its shell.

The pins $b^1$ are screw-threaded and a nut $e$, screwed on each one of the said pins, allows the position of the disk $d$ to be regulated relative to the bearing parts $d^2$. Preferably the nut $e$ has a height almost equal to the width of the corresponding plate $a^2$ and the said plate is provided with a hole having at least the same diameter as the greatest diameter of the nut $e$. With such a disposition it is possible to mount the said plates $a^2$ on the nuts $e$ and to fix each one of the said plates by means of an auxiliary nut $f$ which is also screwed on the screw-threads of the corresponding pin $b^1$.

It is obvious that the invention is in no way limited to the methods of carrying it out which have been more particularly described and that it comprises also all modifications which are in the scope of the claims. For instance, the plug of the cock may be made in such a manner that the two passages formed by its active parts $b$ be of different sizes and even of different shapes. Further the bearing parts $b^2$ could be provided with grooves forming a labyrinthian joint.

Having now described and ascertained the nature of my said invention and in what manner the same may be performed, I declare that what I claim is:

1. A valve comprising a casing having a substantially cylindrical plug-receiving opening and inlet and outlet ports communicating with said opening and a plug rotatably mounted in said opening, said plug having a passage therethrough at a right angle to its axis adapted when the plug is rotated to be brought into register with said inlet and outlet ports, said plug having a portion cut away from its periphery at each end of said passage to form from the remaining portions of its periphery a pair of diametrically arranged and substantially circular portions of greater area than said inlet and outlet ports to fit the wall of said plug-receiving opening and adapted when the plug is rotated to cover and uncover said inlet and outlet ports and to form with the edges of said ports, crescent-shaped openings at any point between the full open and closed positions of said plug.

2. A valve comprising a casing having inlet and outlet ports and a plug-receiving opening at an angle to said inlet and outlet ports, a valve plug disposed in said opening and having substantially circular portions formed to closely fit the wall of the plug-receiving opening and of a greater area than said inlet and outlet ports, bearing members at opposite ends of the plug and of substantially the same diameter as said opening, means for securing the bearing members in the opposite ends of the casing, said valve plug having a bore between said bearing members, and means for rotating the plug to bring the bore of the plug opposite said inlet and outlet ports, the substantially circular portions of the plug being adapted to form a crescent-shaped passage at said ports at any point between the full open and closed positions of the valve plug.

3. A valve of the character described comprising a substantially cylindrical valve casing having an inlet port and an outlet port formed in the side wall thereof, a substantially cylindrical valve plug disposed in the casing and having a bore therein adapted to communicate with said ports, means formed on the plug adapted to coöperate with the edges of said ports for forming a crescent shaped passage at said ports at any point between the full open and closed positions of the plug, the opposite ends of said cylindrical plug being formed with a rabbet, the laterally extending wall of the rabbet being inclined so as to overlie the other wall thereof, anti-frictional members received in said rabbet, spindles extending from the opposite ends of said plug, annular disks surrounding said spindles and adapted to engage said anti-frictional members, adjustable means operating through the medium of said disks for pressing said anti-frictional members against the inclined wall of the rabbet whereby the anti-frictional members may be permanently retained in said rabbet, and means surrounding the spindle and engaging the ends of said valve casing for removably securing said plug in position in said casing.

In testimony whereof I have hereunto set my hand in presence of two subscribing witnesses.

EDMOND FÉLIX GOUDARD.

Witnesses:
  ELY E. PALMER,
  PAUL BLUM.